(12) United States Patent
Yamakita

(10) Patent No.: US 11,426,781 B2
(45) Date of Patent: Aug. 30, 2022

(54) FORMING METHOD OF DISK-SHAPED MEMBER

(71) Applicant: TOYOTA BOSHOKU KABUSHIKI KAISHA, Aichi (JP)

(72) Inventor: Yuta Yamakita, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 192 days.

(21) Appl. No.: 16/376,777

(22) Filed: Apr. 5, 2019

(65) Prior Publication Data

US 2019/0358694 A1 Nov. 28, 2019

(30) Foreign Application Priority Data

May 23, 2018 (JP) .............................. JP2018-099024

(51) Int. Cl.
*B21D 28/26* (2006.01)
*B21D 28/34* (2006.01)
*G05G 5/18* (2006.01)

(52) U.S. Cl.
CPC ............. *B21D 28/26* (2013.01); *B21D 28/34* (2013.01); *G05G 5/18* (2013.01); *G05G 2505/00* (2013.01)

(58) Field of Classification Search
CPC ........ B21D 28/26; B21D 28/02; B21D 28/06; B21D 28/30; B21D 28/24; B21D 24/005; B21D 28/32; B21D 28/34; B21H 5/02
USPC ........................................................ 72/334
See application file for complete search history.

(56) References Cited

U.S. PATENT DOCUMENTS

| | | | | |
|---|---|---|---|---|
| 6,016,602 A * | 1/2000 | Kanemitsu | ............. | B21D 53/28 |
| | | | | 29/893.32 |
| 8,113,030 B2 * | 2/2012 | Fujimura | ............... | B21D 53/28 |
| | | | | 72/377 |
| 2010/0247984 A1 | 9/2010 | Yamashita et al. | | |

FOREIGN PATENT DOCUMENTS

| | | |
|---|---|---|
| JP | 2010-213839 | 9/2010 |
| JP | 2010232089 A | 10/2010 |
| JP | 2016054950 A | 4/2016 |
| WO | WO2010140960 A1 | 12/2010 |

OTHER PUBLICATIONS

Notice of Reasons for Refusal dated Oct. 12, 2021 in the counterpart Japanese patent application No. JP 2018-099024 (and its machine-generated English translation).

* cited by examiner

*Primary Examiner* — Jessica Cahill
*Assistant Examiner* — Smith Oberto Bapthelus
(74) *Attorney, Agent, or Firm* — Greenblum & Bernstein, P.L.C.

(57) ABSTRACT

A forming method of a disk-shaped member in which a plate formed into a disk shape and a protruded flange protruding from an outer periphery of the plate are integrally formed, includes: forming a preformed body from a plate member by a press forming, the preformed body having a protrusion in an outer periphery of the plate, the protrusion having a width larger than a width of the flange; and forming the flange by cutting and removing an outer peripheral surface side of the protrusion to punch the preformed body from the plate member in a state where a mold is in contact with an inner peripheral surface of the protrusion and a portion connected to a root of the protrusion.

1 Claim, 11 Drawing Sheets

FORMING METHOD OF DISK-SHAPED MEMBER

CROSS-REFERENCE TO RELATED APPLICATIONS

This application claims the benefit of Japanese Patent Application No. 2018-099024 filed on May 23, 2018 with the Japan Patent Office, the entire disclosure of which is incorporated herein by reference.

BACKGROUND

The present disclosure relates to a forming method of a disk-shaped member.

Recliners at least comprise, for example, as described in Japanese Unexamined Patent Application Publication No. 2010-213839, a disk-shaped guide member fixed to a cushion frame, and a disk-shaped ratchet fixed to a back frame. The recliner rotatably connects the back frame to the cushion frame.

The ratchet has a protruded flange formed in an outer periphery of the ratchet, and the flange has serrations to be engaged with serrations formed on a pawl. The pawl is movable toward and from the flange. The pawl is housed in a space between the guide member and the ratchet.

The guide member has a guide wall guiding the pawl's movement in a radial direction of the guide member and restricting the pawl's movement in a circumferential direction. In an outer periphery of the guide member, a protruded flange protruding along an entire periphery of the guide member is formed.

The pawl is a plate member housed in a space formed between the ratchet and the guide member. The guide wall is in sliding-contact with an end face of the pawl, whereby the guide wall guides the pawl's movement in the radial direction while restricting the pawl's movement in the circumferential direction.

SUMMARY

The ratchet is positioned on an inner peripheral side of the flange of the guide member. Thus, to reduce external dimensions and weight of the recliner, it is preferable to reduce a width of the flange.

However, when a whole of the guide member including the flange is formed from a plate member by press forming, it is difficult to form a flange having a small width.

The present disclosure discloses an example production method of a flange having a small width in a disk-shaped member, such as a guide member.

According to an aspect of the present disclosure, a forming method of a disk-shaped member in which a protruded flange protruding from an outer periphery of a disk-shaped plate is integrally formed preferably comprises the following constituent features.

A forming method of a disk-shaped member according to an aspect of the present disclosure comprises: a first step to form a preformed body from a plate member by press forming, the preformed body comprising a plate and a protrusion formed in an outer periphery of the plate, the protrusion having a width larger than a width of a flange; and a second step to form the flange after the first step by cutting and removing an outer peripheral surface side of the protrusion to punch the preformed body from the plate member in a state where a mold is in contact with an inner peripheral surface of the protrusion and a portion connected to a root of the protrusion.

According to the above, in the first step, a protrusion having a width formable by press forming, that is, a portion to become a flange is formed. In the second step, the preformed body is punched from the plate member by cutting and removing the outer peripheral surface side of the protrusion. Thus, it is possible to produce a disk-shaped member with a flange having a small width.

It is preferable to form the flange by moving a certain punch used in the second step in a direction opposite to another punch used in the first step in a state where the certain punch is in contact with an inner peripheral surface of the protrusion and a portion connected to a root of the protrusion. This facilitates punching of the preformed body from the plate member.

BRIEF DESCRIPTION OF THE DRAWINGS

Several embodiments of the present disclosure will be described hereinafter with reference to the accompanying drawings, in which.

DETAILED DESCRIPTION OF THE PREFERRED EMBODIMENTS

Figure 1:
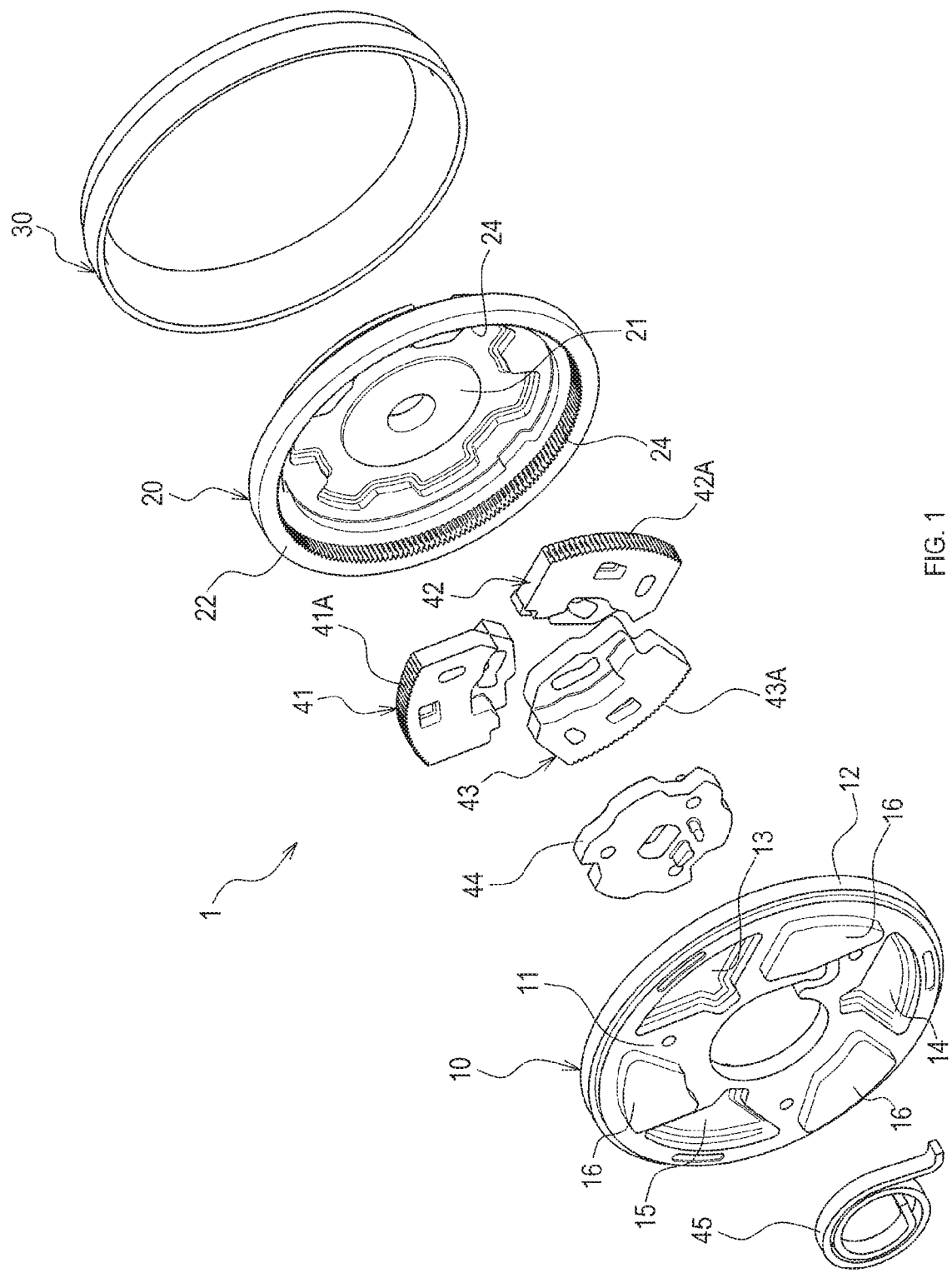
FIG. 1 is an exploded view of a recliner according to a first embodiment.

The embodiments described below are example embodiments within the technical scope of the present disclosure. In other words, matters specifying the invention recited in the claims are not limited to specific configurations, structures, or the like shown in the embodiments below.

At least a member or portion described with a reference numeral is provided at least one in number unless there is a specifying term, such as "only one". In other words, two or more members or portions may be provided unless there is a specifying term, such as "only one."

The present embodiments describe examples of a recliner of the present disclosure applied to a seat (hereinafter, referred to as a vehicle seat) mounted on a vehicle, such as a passenger car. Arrows and other marks indicating directions shown in the figures are provided for the purpose of easy understanding of mutual relationships of the figures.

The present disclosure is not limited by the directions shown in the figures. The directions shown in the figures mean respective directions in a state where a vehicle seat of the present embodiment is assembled to a vehicle.

First Embodiment

1. Overview of Recliner

For example, as shown in FIG. 1, a recliner 1 at least comprises a guide member 10, a ratchet 20, an outer periphery ring 30, and pawls 41, 42, 43.

<Guide Member>

The guide member 10 is one example of a disk-shaped member fixed to, for example, a cushion frame (not shown). The cushion frame is a member forming a framework of a seat cushion. The seat cushion is a portion supporting an occupant's buttocks.

Figure 2:
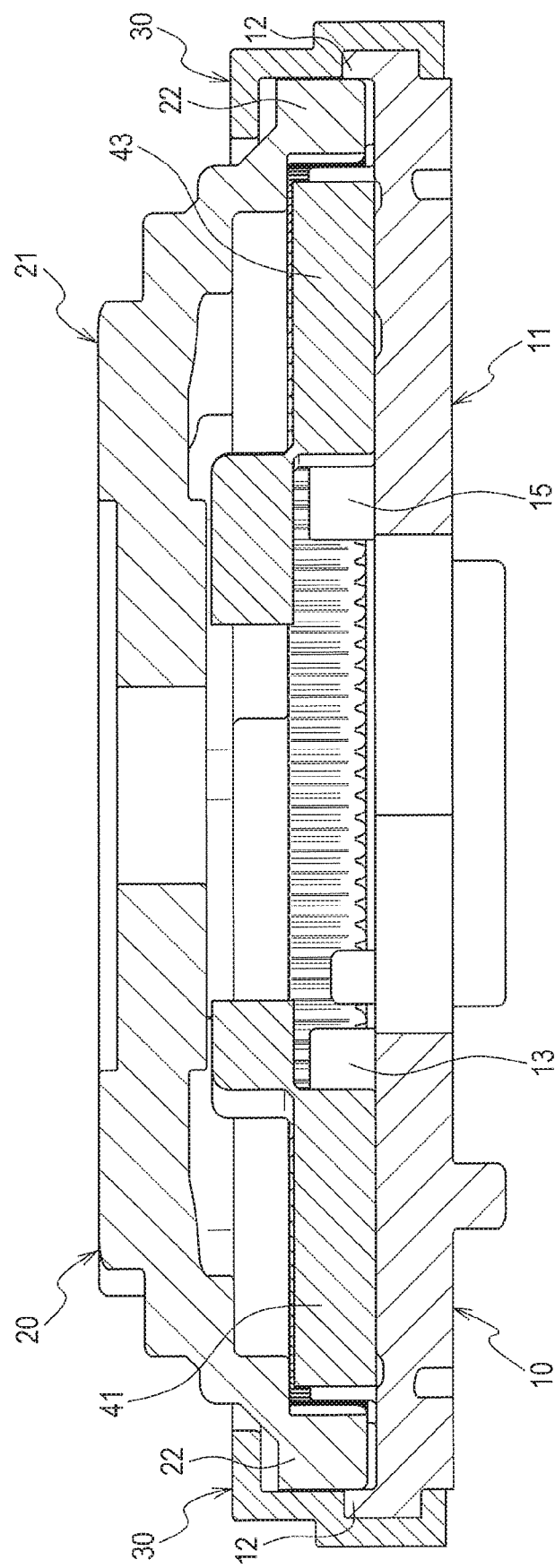
FIG. 2 is a drawing of a structure of the recliner according to the first embodiment.

As shown in FIG. 2, the guide member 10 is a disk-shaped member comprising a substantially disk-shaped plate 11 and a flange 12. The flange 12 is a protrusion protruding from an outer periphery of the plate 11 in a direction orthogonal to the plate 11.

The flange 12 is integrally formed with the plate 11 from a metal plate by plastic forming, such as press forming. The ratchet 20 is arranged on an inner peripheral side of the flange 12. Thus, the inner peripheral surface of the flange 12 and an outer peripheral surface of flange 22 may be in sliding-contact with each other.

<Ratchet>

The ratchet 20 is a member fixed to, for example, a back frame (not shown). The back frame is a member forming a framework of a seatback. The seatback is a portion supporting an occupant's back.

The ratchet 20 is, as shown in FIG. 1, a disk-shaped member comprising a disk-shaped plate 21 and the flange 22. The plate 21 is a portion arranged to face the plate 11 of the guide member 10 across a space (see FIG. 2).

As shown in FIG. 1, the flange 22 is a protrusion protruding from an entire outer periphery of the plate 21 toward the plate 11. The flange 22 is integrally formed with the plate 21 from a metal plate by plastic forming, such as press forming.

The guide member 10 and the ratchet 20 are coupled by the outer periphery ring 30. The outer periphery ring 30 restricts a separation of the guide member 10 from the ratchet 20 while allowing the guide member 10 to be rotatable relative to the ratchet 20.

<Pawl and Others>

In the inner peripheral surface of the flange 22, as shown in FIG. 1, serrations 24 are formed so as to be engaged with serrations 41A, 42A, 43A. The serrations 41A to 43A are respectively provided on the pawls 41 to 43. Each of the pawls 41 to 43 is moved in a radial direction of the guide member 10, thus, the pawls 41 to 43 are moved toward and from the serrations 24.

Each of the pawls 41 to 43 is housed in a space between the guide member 10 and the ratchet 20 (see FIG. 2). A hinge cam 44 is a member to move the pawls 41 to 43. When the hinge cam 44 rotates in response to an external operation force, each of the serrations 41A to 43A of each of the pawls 41 to 43 is separated from the serrations 24.

When the operation force disappears, the pawls 41 to 43 are moved to positions where the serrations 41A to 43A fit in the serration 24 by an elastic force of a spiral spring 45 (see FIG. 1), then, the pawls 41 to 43 are maintained at the positions by the elastic force.

Figure 3:
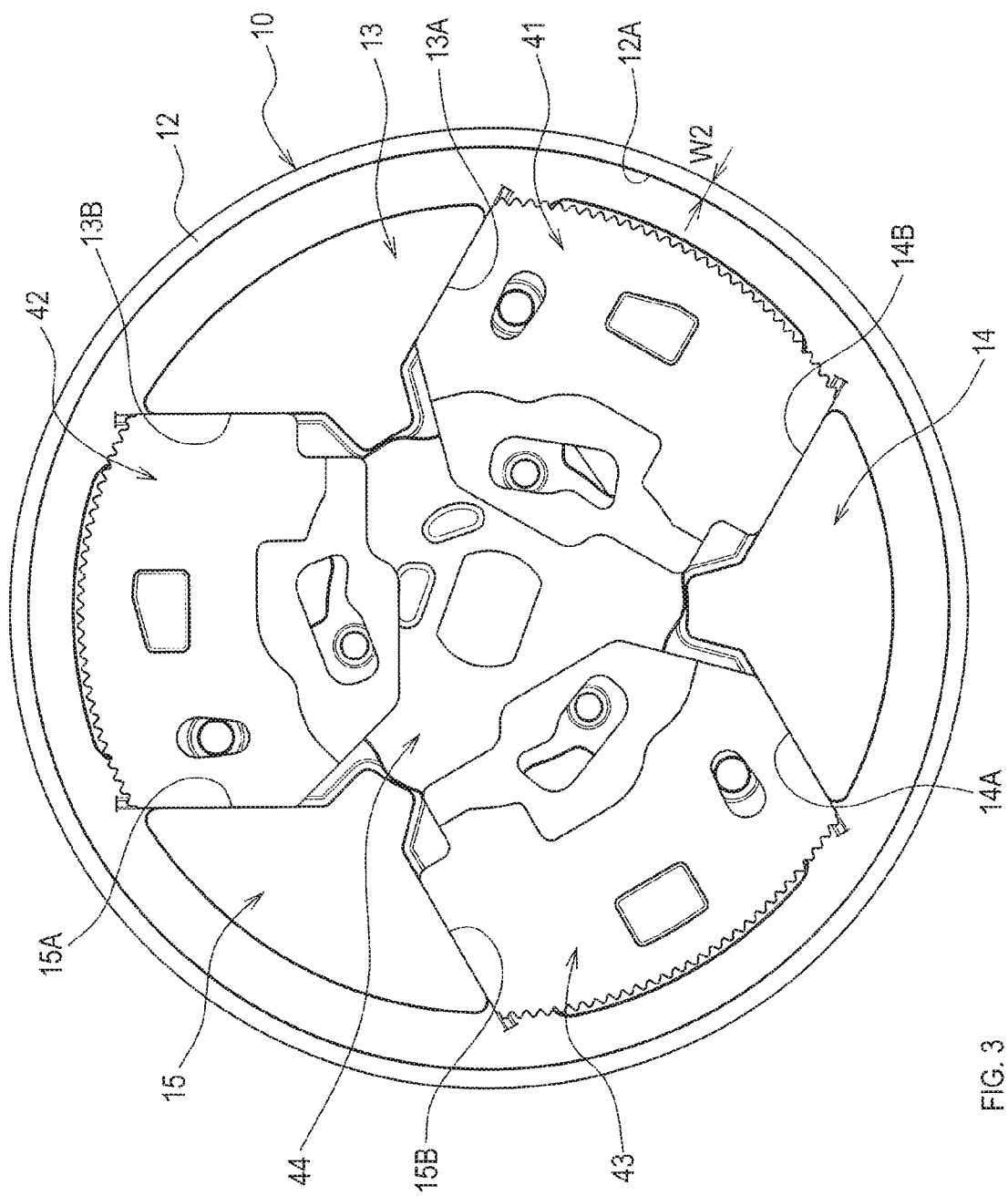
FIG. 3 is a drawing of a structure of the recliner according to the first embodiment.

As shown in FIG. 3, the guide member 10 has a plurality of protrusions 13, 14, 15 on an inner peripheral side of the flange 12. The protrusions 13 to 15 are substantially fan-shaped portions protruding toward the plate 21 (the ratchet 20).

The protrusion 13 has guide walls 13A, 13B formed on its sides. The protrusion 14 has guide walls 14A, 14B formed on its sides. The protrusion 15 has guide walls 15A, 15B formed on its sides.

Each of the guide walls 13A to 15B is formed by a wall surface extending in a direction parallel to the radial direction. Between two guide walls facing each other among the guide walls 13A to 15B, each one of the pawls 41 to 43 is arranged.

Specifically, a first pawl 41 is positioned between the guide wall 13A and the guide wall 14B. A third pawl 43 is positioned between the guide wall 14A and the guide wall 15B. A second pawl 42 is positioned between the guide wall 15A and the guide wall 13B.

For example, due to the sliding-contact with the pawl 41, the guide wall 13A and the guide wall 14B serve as a guide for a movement of the first pawl 41, and at the same time, serve as a restriction for a movement of the first pawl 41 in a circumferential direction.

As shown in FIG. 1, the plate 11 is provided with at least one protrusion 16 (three protrusions in the present embodiment). These protrusions 16 are portions fitted into recesses (not shown) formed in the cushion frame.

2. Production Method of Guide Member

The guide member 10 according to the present embodiment is made of a metal plate by press forming. Specifically, the guide member 10 is produced by performing at least three steps (a first preforming step, a second preforming step, and a punching step).

Figure 4:
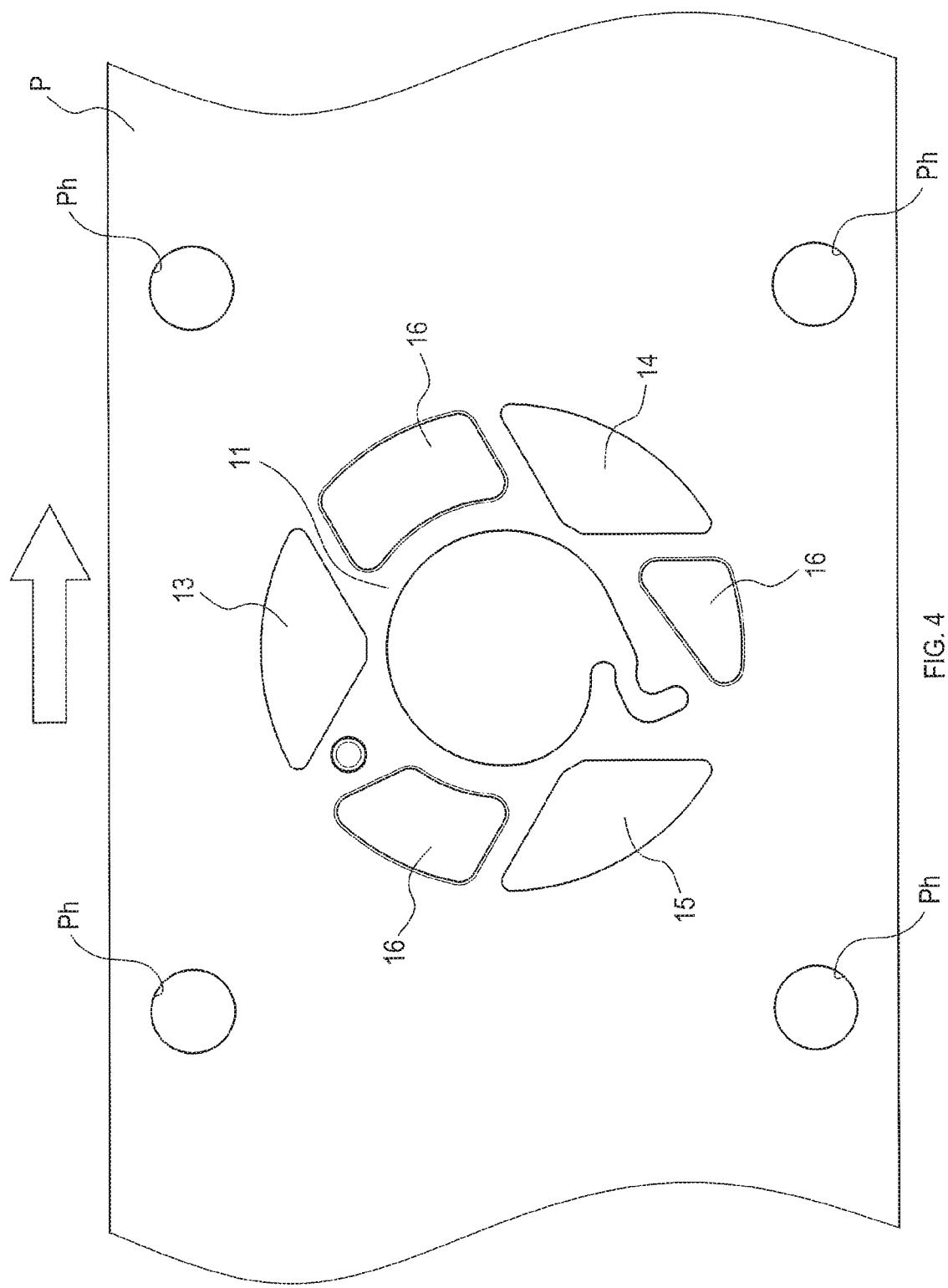
FIG. 4 is an explanatory view of a first preforming step.

A pressing device for producing the guide member 10 is a transfer type pressing device that implements each step for a metal strip member P (see FIG. 4) while delivering the strip member P, for example, in a direction of an arrow shown in FIG. 4.

<First Preforming Step>

Figure 5:
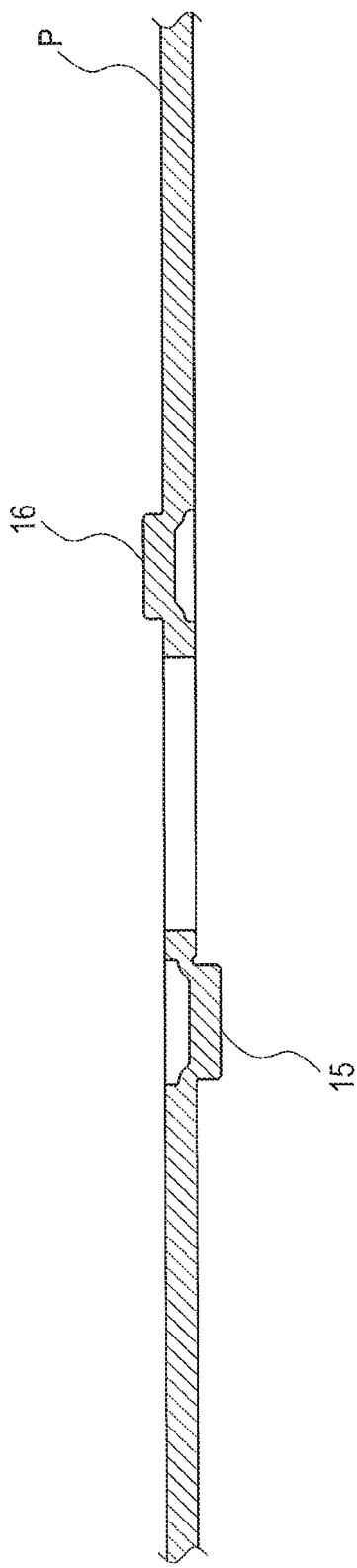
FIG. 5 is an explanatory view of the first preforming step.

As shown in FIG. 4 and FIG. 5, a first preforming step is a step to form the protrusions 13 to 15, 16 and the like on the metal strip member P by press forming. Holes Ph shown in FIG. 4 are through holes into which pilot pins (not shown) are inserted. The pilot pin is a protrusion for positioning the strip member P with respect to a mold for press forming, such as a die.

<Second Preforming Step>

Figure 6:
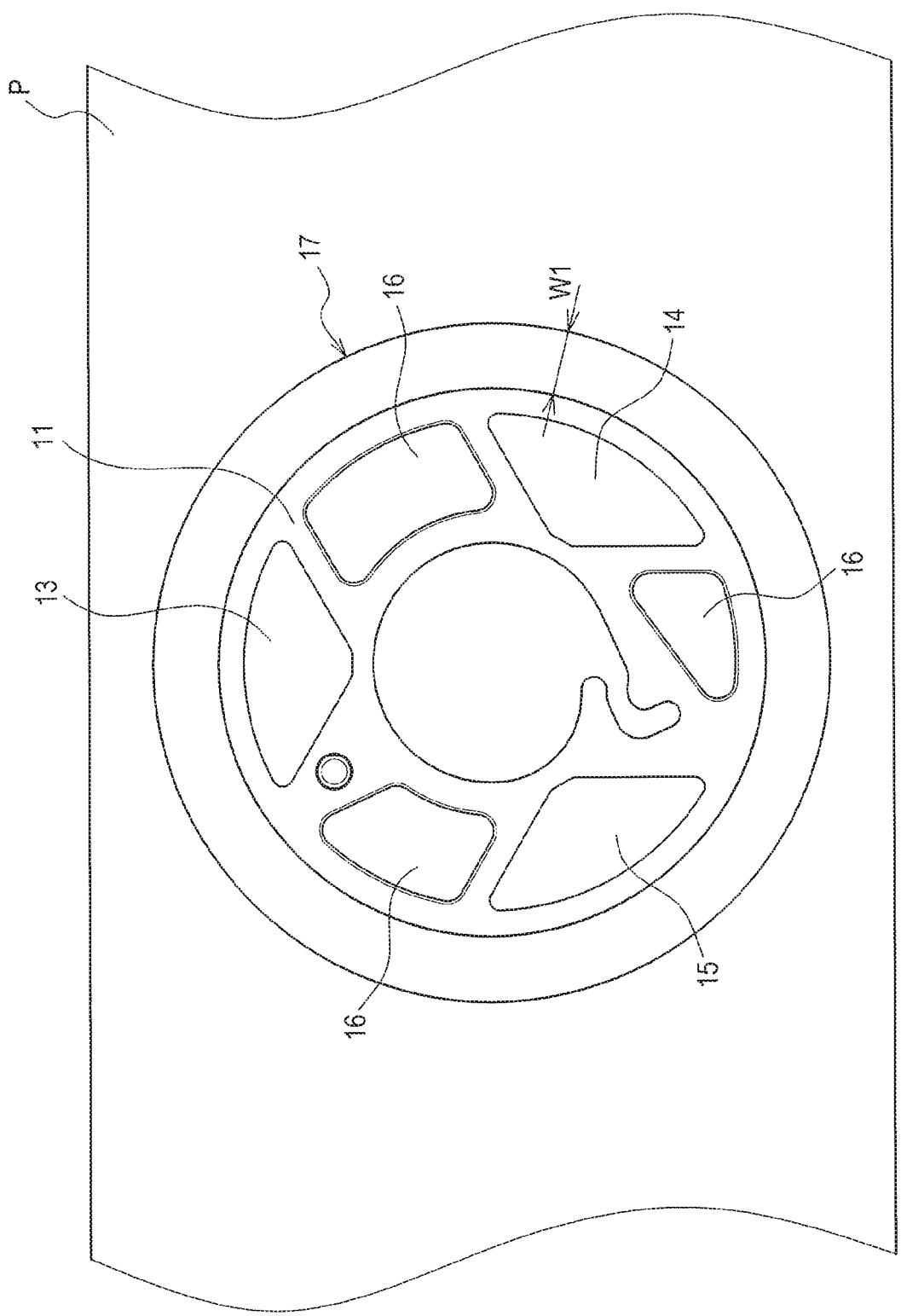
FIG. 6 is an explanatory view of a second preforming step.
Figure 7:
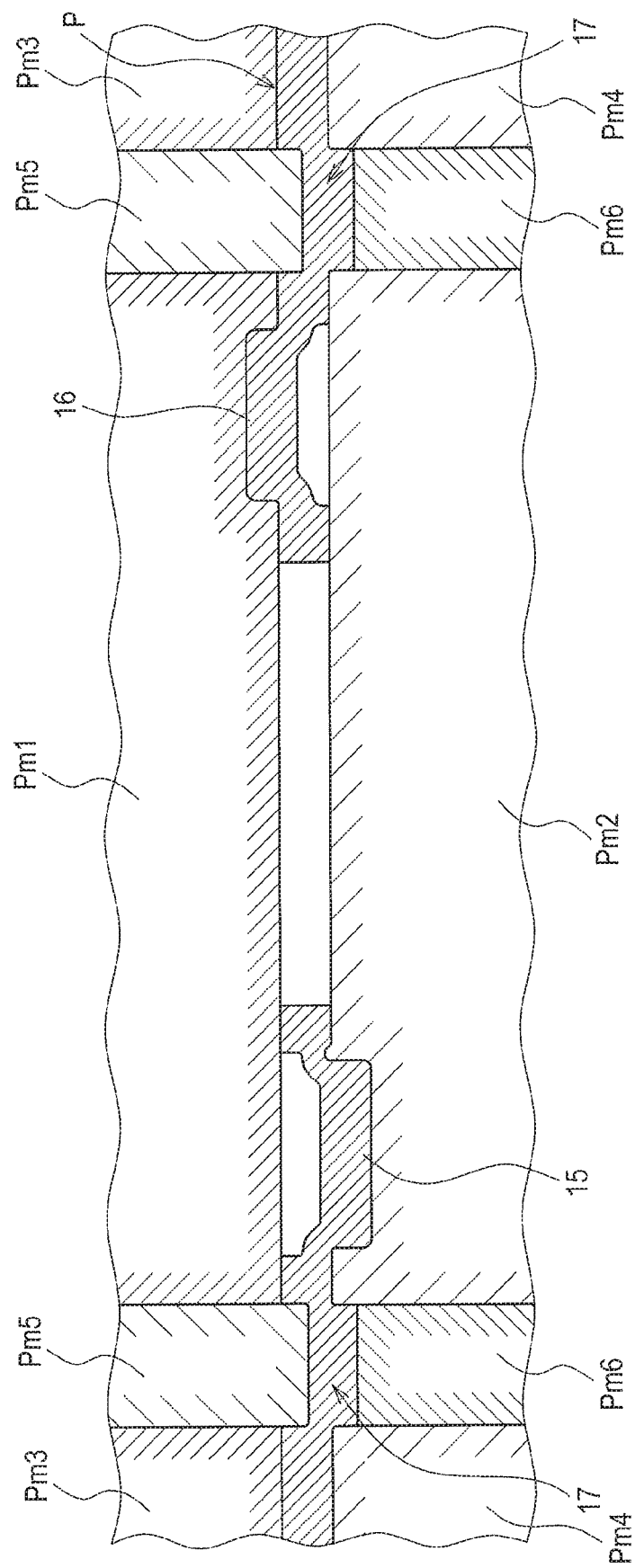
FIG. 7 is an explanatory view of the second preforming step.

As shown in FIG. 6 and FIG. 7, a second preforming step is a step to form a strip member P in which a protrusion 17 is provided on an outer periphery of the plate 11 (hereinafter, referred to as a preformed body) by performing press forming on the metal strip member P.

The protrusion 17 is a flange protruding from an outer periphery of the plate 11 in a direction orthogonal to the plate 11. The protrusion 17 has a width W1 (see FIG. 6) larger than a width W2 of the flange 12 (see FIG. 3). An inner peripheral surface 17A of the protrusion 17 (see FIG. 8) corresponds to an inner peripheral surface 12A of the flange 12 (see FIG. 3).

Figure 8:
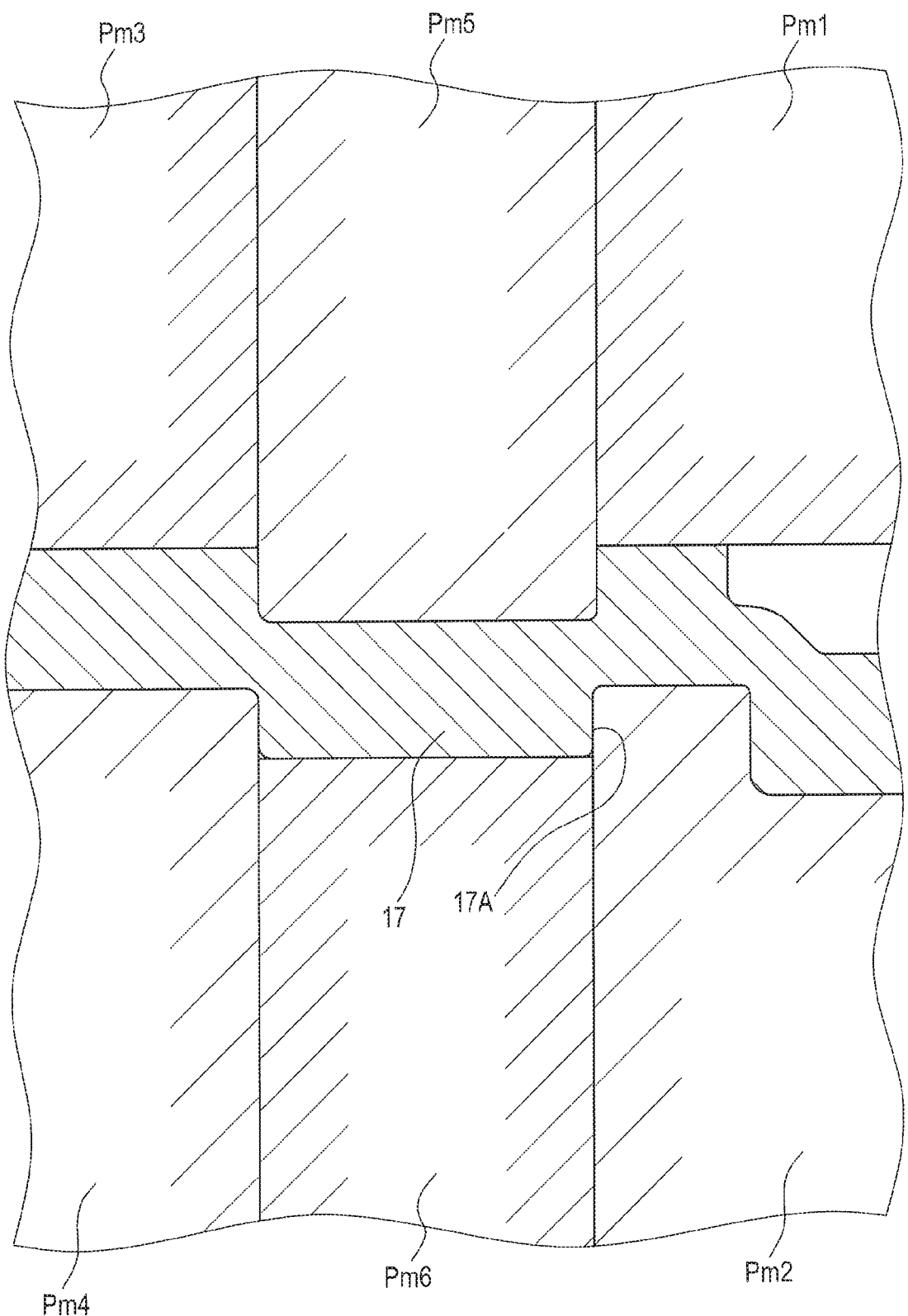
FIG. 8 is an explanatory view of the second preforming step.

Specifically, as shown in FIG. 7 and FIG. 8, in the second preforming step, a portion in which the plate 11, the protrusions 13 to 15, 16 and the like are formed, that is, a portion of the strip member P except for the protrusion 17 is sandwiched and held by molds Pm1, Pm2, Pm3 and Pm4, and in such a state, the protrusion 17 is pressed and formed by a punch Pm5 and a die Pm6.

In other words, the die Pm6 is a fixed mold with a recess to form the protrusion 17. The punch Pm5 is a movable mold to form the protrusion 17 by pressing the strip member P toward the die Pm6 and plastically flowing a part of the strip member P.

The molds Pm1 to Pm4 may be molds used in the first preforming step. In a case where the molds used in the first preforming step are used in the second preforming step, the strip member P may not be moved at the time of shifting from the first preforming step to the second preforming step.

In other words, in the first preforming step, the punch Pm5 and the molds Pm1 and Pm3 are integrally moved toward the die Pm6, and the molds Pm2 and Pm4 to press the strip member P. When the step is shifted from the first preforming step to the second preforming step, the die Pm6 is moved, and then the punch Pm5 is moved so as to follow the die Pm6 to press the strip member P toward the die Pm6.

<Punching Step>

Figure 9:
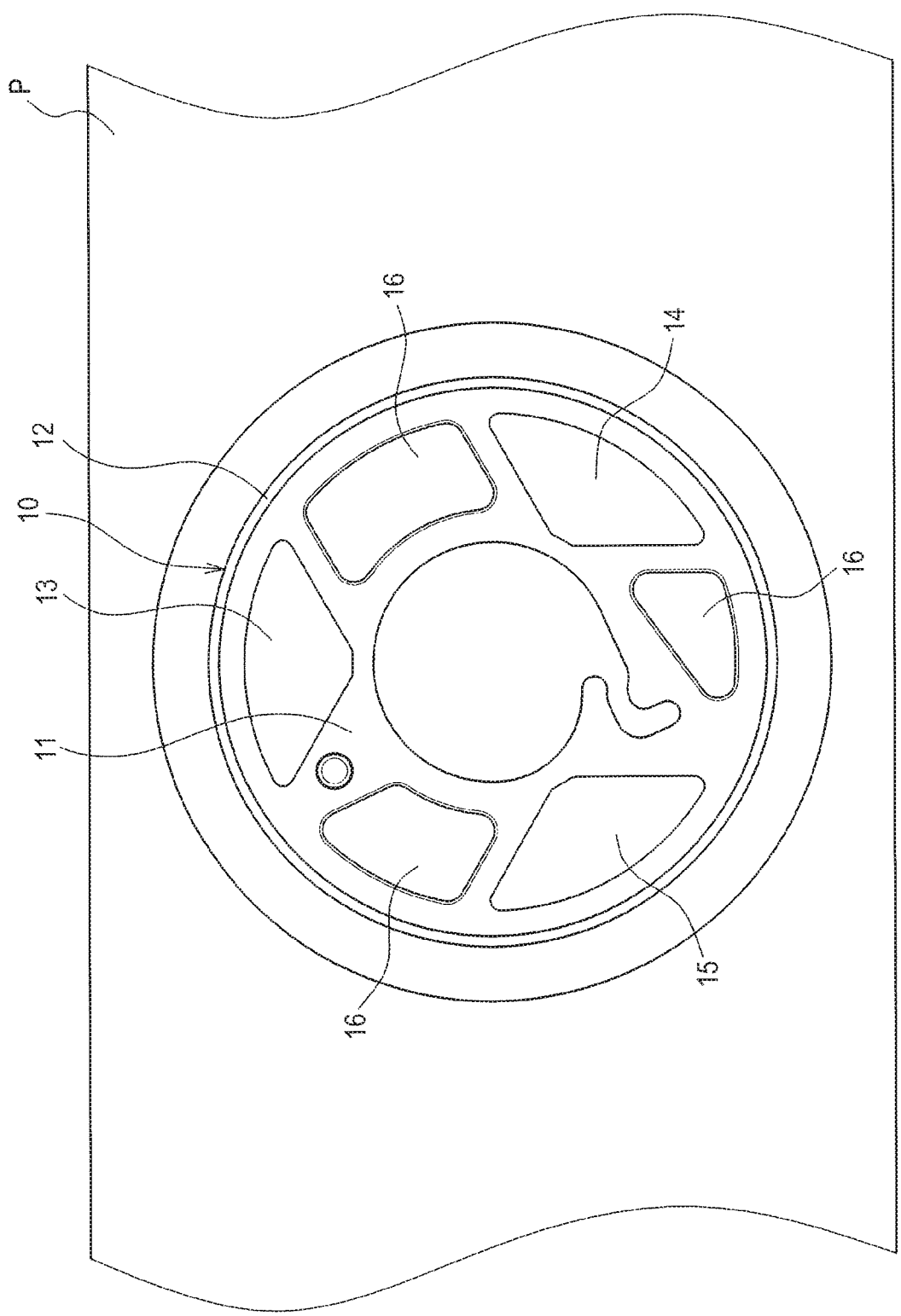
FIG. 9 is an explanatory view of a third preforming step.
Figure 10:
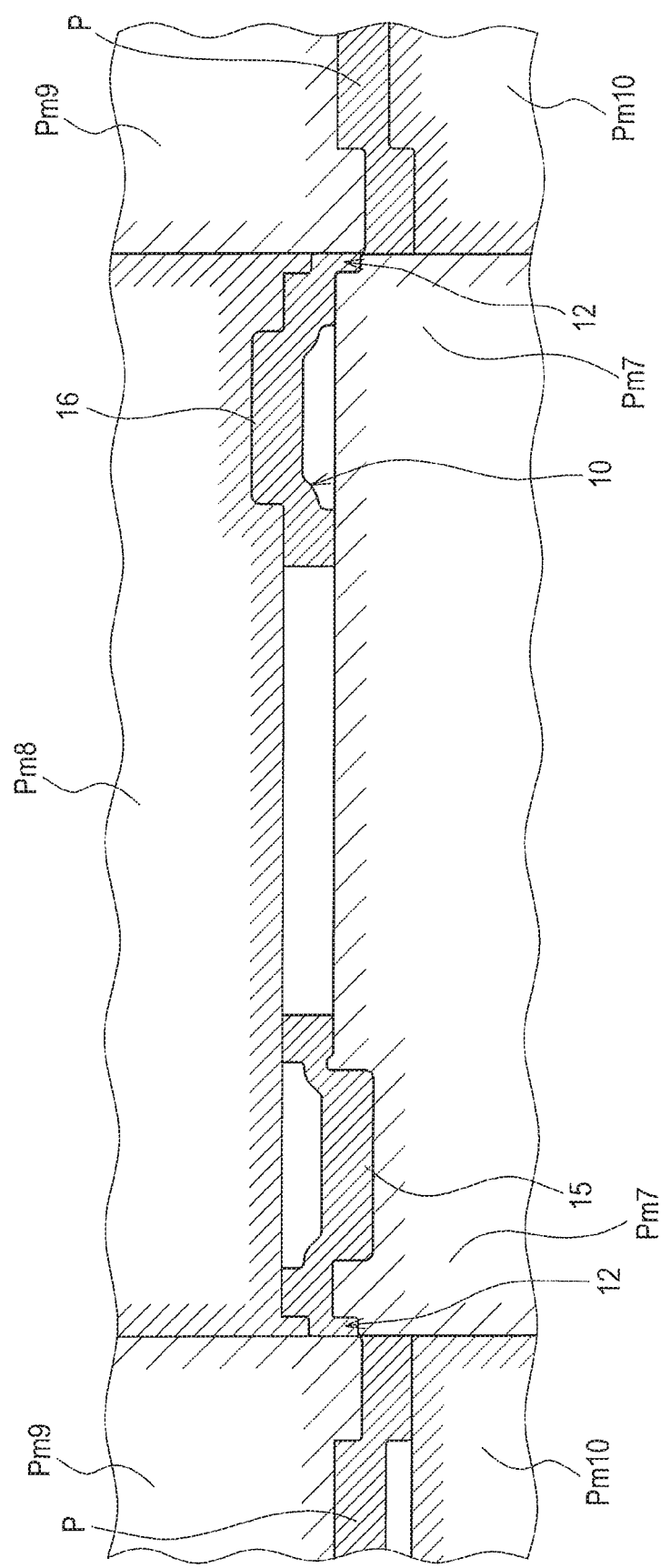
FIG. 10 is an explanatory view of the third preforming step.

As shown in FIG. 9 and FIG. 10, a punching step is a step to punch the preformed body from the strip member P by cutting and removing an outer peripheral surface side of the protrusion 17, thereby forming the guide member 10 having the flange 12.

Figure 11:
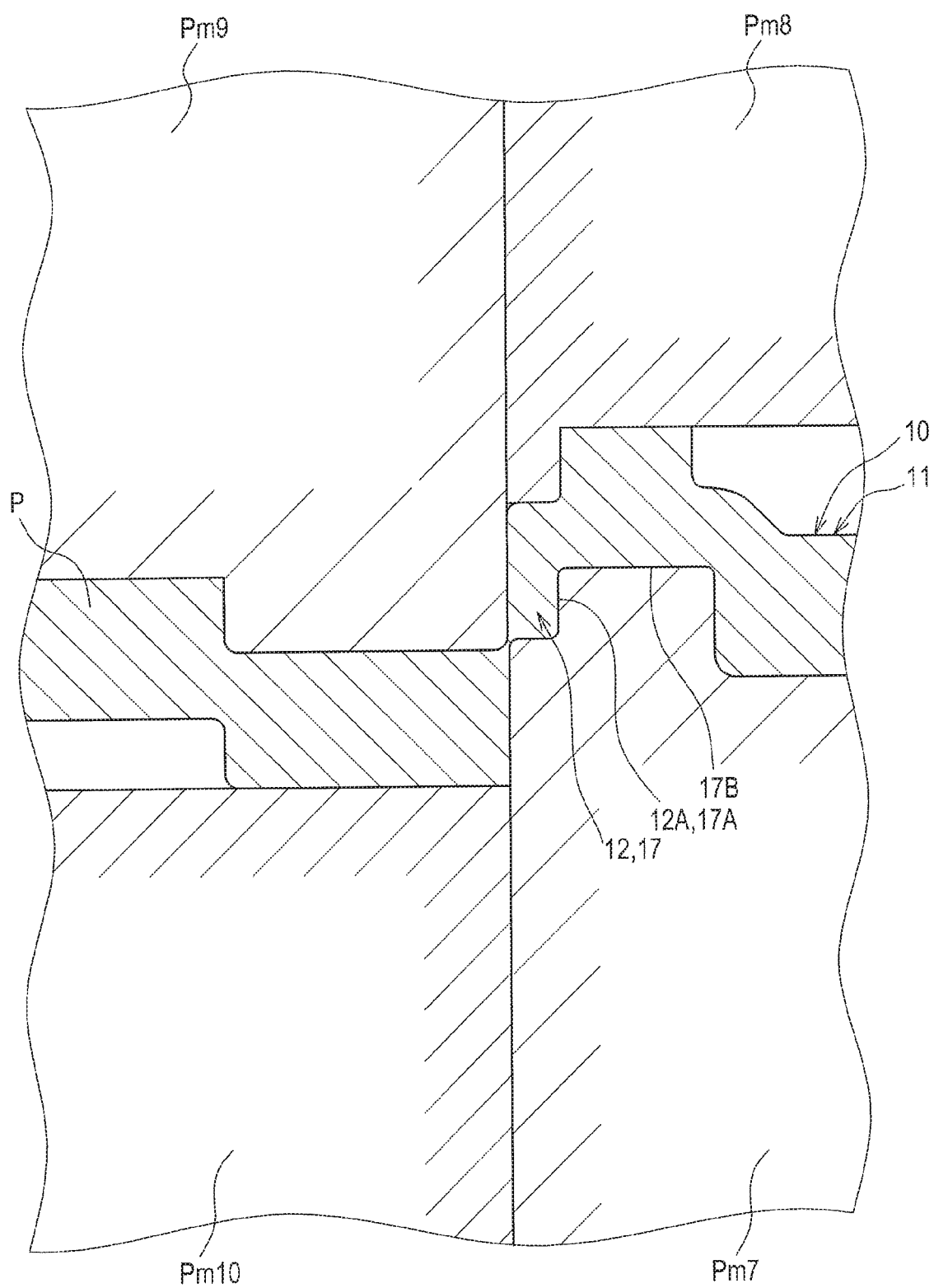
FIG. 11 is an explanatory view of the third preforming step.

Specifically, in the punching step, as shown in FIG. 11, the preformed body is punched from the strip member P in a state where a punch Pm7 is in contact with the inner peripheral surface 17A of the protrusion 17 and a portion 17B connected to a root of the protrusion 17.

This punching process is press forming performed by the punch Pm7 and the die Pm8 in a state where the strip member P including the preformed body is sandwiched and held by molds Pm9 and Pm10.

The punch Pm7 is a movable mold to cut and remove the outer peripheral surface side of the protrusion 17 by pressing the preformed body (strip member P) toward the die Pm8 while the punch Pm7 is in contact with the inner peripheral surface 17A of the protrusion 17 and the portion 17B connected to the root of the protrusion 17. The die Pm8 is a fixed mold to receive a pressing force of the punch Pm7 acting on the protrusion 17.

When the punch Pm7 presses the protrusion 17, the punch Pm7 is moved in a direction opposite to the punch Pm5 used in the second preforming step. More specifically, after the die Pm8 is moved, the punch Pm7 is moved so as to follow the die Pm8 to press the strip member P toward the die Pm8.

3. Features of Forming Method of Present Embodiment

A forming method of the present embodiment at least comprises the second preforming step and the punching step. In the second preforming step, the preformed body, in which the protrusion 17 having a width larger than the width of the flange 12 is formed in the outer periphery of the plate 11, is pressed and formed from the strip member P.

In the punching step, after the second preforming step, the outer peripheral surface side of the protrusion 17 is cut and removed in a state where the mold Pm7 is in contact with the inner peripheral surface 17A of the protrusion 17 and the portion 17B connected to the root of protrusion 17.

Accordingly, in the second preforming step, the protrusion 17 having a width formable by press forming, that is, a portion to become the flange 12, is formed. In the punching step, the preformed body is punched from the plate member by cutting and removing the outer peripheral surface side of the protrusion. 17. Thus, it is possible to produce the guide member 10 with the flange 12 having a small width.

Specifically, the punch Pm7 used in the punching step is moved in a direction opposite to the punch Pm5 used in the second preforming step while the punch Pm7 is in contact with the inner peripheral surface 17A of the protrusion 17 and the portion 17B connected to the root of the protrusion 17. This facilitates punching of the preformed body from the strip member P.

[Other Embodiments]

In the aforementioned embodiment, a recliner has been described in which the guide member 10 is fixed to a cushion frame and the ratchet 20 is fixed to a back frame. However, the present disclosure is not limited to this.

That is, the present disclosure may be a recliner in which, for example, the guide member 10 is fixed to the back frame and the ratchet 20 is fixed to the cushion frame.

In the aforementioned embodiment, an example production method of the guide member 10 has been described. However, the present disclosure is not limited to this. That is, the present disclosure is applicable, for example, for a flange 22 of the ratchet 20 or a flange of other disk-shaped members.

In the aforementioned embodiment, the punch Pm7 used in the punching step is moved in the direction opposite to the punch Pm5 used in the second preforming step. However, the present disclosure is not limited to this.

In the aforementioned embodiment, the molds Pm1 to Pm4 are the molds used in the first preforming step. However, the present disclosure is not limited to this. That is, it may be possible for the present disclosure to employ a configuration in which, for example, the second preforming is carried out by using molds for an exclusive use in the second preforming step.

In the aforementioned embodiment, the forming method of the present disclosure has been applied to a production of the recliner to be used in the vehicle seat. However, an application of the present disclosure is not limited to this, and the present disclosure may be applied to seats for vehicles, such as railway vehicles, ships and boats, and aircrafts, as well as stationary seats for theaters, homes, and the like.

Furthermore, the present disclosure may be embodied in various forms within the purpose of the invention described in the claims, and the present disclosure is not limited to the aforementioned embodiments. Accordingly, it may be possible to employ a configuration obtained by combining at least two embodiments among the aforementioned embodiments, or a configuration obtained by removing a constituent feature of the invention described in the embodiments.

What is claimed is:

1. A forming method of a disk-shaped member in which a plate formed into a disk shape and a protruded flange protruding in a direction orthogonal to the plate from an outer periphery of the plate are integrally formed, comprising:

forming a preformed body from a plate member by press forming, the preformed body having a protrusion formed in an outer periphery of the plate, the protrusion having a width larger than a width of the protruded flange, the protrusion protruding in the direction orthogonal to the plate, and forming the protruded flange, after forming the preformed body, by cutting and removing an entire periphery of an outer peripheral surface side of the protrusion such that a remaining part of the protrusion after the cutting and removing of the outer peripheral surface side of the protrusion serves as the protruded flange protruding in the direction orthogonal to the plate, thereby to punch the preformed body from the plate member in a state where a mold is in contact with an inner peripheral surface of the protrusion and a portion connected to a root of the protrusion, wherein when the preformed body is formed from the plate member by press forming, a second punch presses the plate member toward a die to an extent not to exceed a plate thickness of the plate member to form the protrusion in a state where the second punch is in contact with a first surface of the plate member and the die is in contact with a second surface of the plate member which is opposite to the first surface, and at the time an inner peripheral surface of the second punch and an inner peripheral surface of the die are in the same plane, wherein after the second punch is used to form the preformed body from the plate member by the press forming, a first punch is used as the mold to punch the preformed body from the plate member whereby the protruded flange protruding in the direction orthogonal to the plate is formed, and wherein when the first punch punches the preformed body from the plate member, the first punch is moved in a direction opposite to a direction, in which the second punch is moved when forming the preformed body from the plate member by the press forming, in a state where the first punch is in contact with the inner peripheral surface of the protrusion and the portion connected to the root of the protrusion.

* * * * *